C. A. HENNICKE.
EVENER AND WHIFFLETREE COUPLING.
APPLICATION FILED DEC. 29, 1908.
944,264.
Patented Dec. 28, 1909.
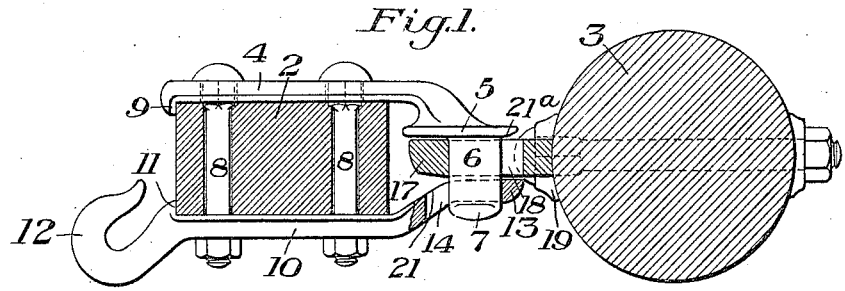
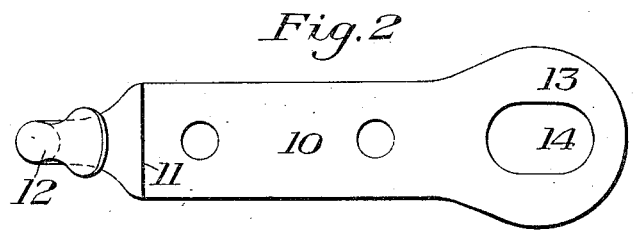
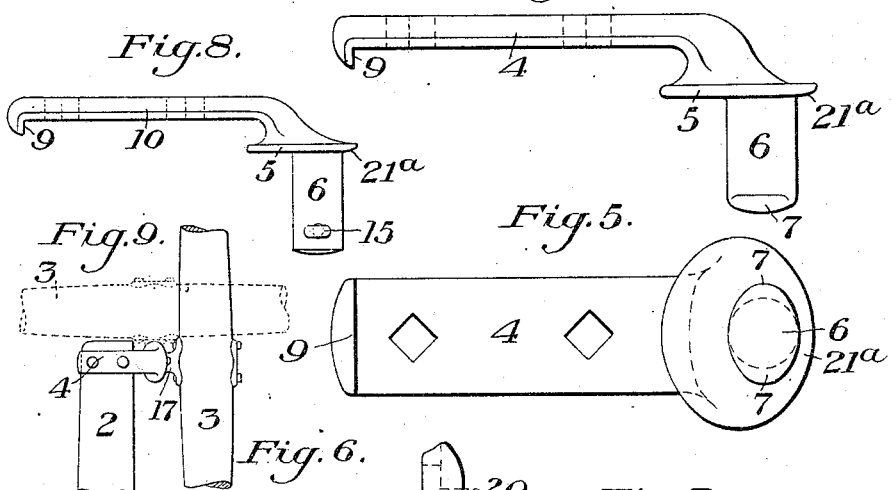
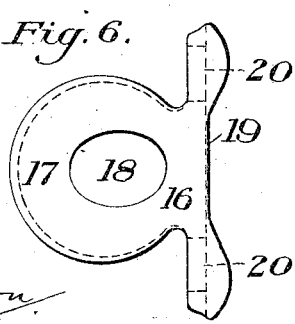
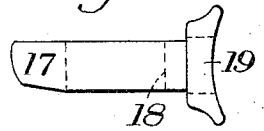
WITNESSES
R A Balderson
G L Winters
INVENTOR
Charles A. Hennicke
by Bakewell Byrnes & Parmelee
his attys ively of the

UNITED STATES PATENT OFFICE.

CHARLES A. HENNICKE, OF BUFFALO, NEW YORK.

EVENER AND WHIFFLETREE COUPLING.

944,264.   Specification of Letters Patent.   Patented Dec. 28, 1909.

Application filed December 29, 1908. Serial No. 469,798.

*To all whom it may concern:*

Be it known that I, CHARLES A. HEN-NICKE, of Buffalo, county of Erie, and State of New York, have invented a new and useful Improvement in Evener and Whiffletree Couplers, of which the following is a full, clear, and exact description, reference being had to the accompanying drawings, forming part of this specification, in which—
Figure 1 is a sectional view showing the application of my invention; Figs. 2 and 3 are respectively plan and side views of the lower member of the coupling; Figs. 4 and 5 are respectively side and bottom plan views of the upper member of the coupling; Figs. 6 and 7 are respectively plan and side views of the coupling link or eye; Fig. 8 is a detail view showing the modification; and Fig. 9 is a plan view, on a reduced scale, of a portion of the evener and whiffle tree, and showing the whiffle tree swung at right angles, in dotted lines.

My invention has relation to evener and whiffle tree couplings, and is designed to provide a coupling of this character, which will carry the whiffle tree directly in front of the evener and which will permit the whiffle tree to adjust itself to the different lines of draft when the vehicle is passing over rough and uneven roads; also to do away with the old fashioned link or ring connection between the whiffle tree and evener, and thereby prevent the whiffle tree from swinging loosely at the ends of the animal's heels and avoid the possibility of its hind legs becoming entangled with the traces.

Another object is to so construct the couplings that the whiffle trees can be turned at right angles, or to a position approximately parallel to the tongue when not in use.

A further object is to produce an evener and whiffle tree coupling which combines simplicity of construction with great strength and low cost.

The nature of my invention will be best understood by reference to the accompanying drawing, which will now be described, it being premised, however, that various changes may be made in the details of construction and arrangement without departing from the spirit and scope of my invention as defined in the appended claims.

In these drawings, the numeral 2 in Fig. 1 designates the evener bar, and 3 the whiffle tree.

4 is the top member of the evener coupling. This member is formed at its forward end with a downwardly extending flange portion 5, and projecting downwardly from said flange is a strong draft pin 6, having on its lower end a head or flange 7. The member 4 is provided also with bolt holes whereby it can be secured to the evener bar by the bolts 8, and at its rear end has a flange 9, engaging over the rear edge of the bar.

10 designates the lower member of the evener coupling, which is provided at its rear end with a flange or shoulder 11, engaging the rear edge of the evener bar and also with a hook 12, for the attachment of a stay chain (not shown) extending to the axle of the vehicle. The forward end of the member 10 is bent forwardly and is formed with an enlarged flange or bearing portion 13, having therein an opening or aperture 14, of the proper size and shape to receive the draft pin 6. The head 7 of this pin is shown in Fig. 1 as formed by flanges extending in opposite directions on two sides of the pin and the hole 14 is somewhat elongated. To insert the pin 6 in the hole 14, it is necessary to turn one member at approximately right angles to the other, so that the head of the pin will pass through the opening after which the members are turned into their normal parallel relation, whereby the head 7 forms an efficient lock for the purpose. The member 10 is also provided with bolt holes to receive the bolts 8. Instead of providing the pin 6 with the head 7, a cotter pin 15 may be used, as shown in Fig. 8, or any other suitable fastening, such as a nut or washer, may be employed.
16 is the coupling eye which is provided with a body portion 17, of sufficient size and thickness to substantially fill the space between the flange portions 5 and 13 of the upper and lower coupling members, and which is also provided with an aperture 18 therethrough, for the draft pin 6. The eye is also provided with a bearing portion 19, to fit against the rear side of the whiffle tree 3 and formed with bolt holes 20, or other suitable means by which it can be rigidly secured to the whiffle tree. The rear upper portion of the bearing flange 13 is rounded, as shown at 21, and the forward lower surface of the bearing flange 5 is rounded or beveled, as shown at 21ᵃ, these rounded or beveled surfaces permitting an upward rocking movement of the member 17 to adjust itself to varying strains and different positions, while the vehicle is passing over rough and uneven roads. The forward portion of the upper surface of the flange 13 and the rear portion of the lower surface of the bearing flange 5 are flat surfaces which engage corresponding surfaces on the member 17 and hold said member in a horizontal position, preventing the same from dropping and allowing the whiffle tree to swing loosely at the heels of the animal.

By reference to Fig. 9, it will be seen that the coupling is so constructed that the whiffle trees can be turned to a plane parallel to the tongue, when not in use, thereby greatly economizing stable space.

It will be seen that my improved coupling is not only simple and strong in its construction, but can be manufactured at a low cost, and that the whiffle tree will be carried directly in front of the evener and also prevented from swinging loosely at the animal's heels, while free to adjust itself to the varying lines of draft.

I claim:

1. An evener coupling having a top member provided at its front end with a flange portion and carrying a draft pin having an interlocking flange or head at its lower end, the flange portion being rounded on its lower front side to admit of upward rocking movement of the whiffle tree coupling, substantially as described.

2. An evener coupler, consisting of upper and lower members secured to the evener bar, one of said members having an opening and the other of said members having a draft pin engaging said opening, said members having opposed separated flange portions, and a coupling member engaging the draft pin between said flange portions, said flange portions having carrying surfaces arranged to prevent downward movement of the coupling but to permit an upward rocking movement thereof; substantially as described.

3. A whiffle tree coupling having a body portion formed with an opening therethrough for a draft pin, said body portion having a flat upper surface and having its lower surface beveled or rounded to permit of an upward rocking movement of said coupling to accommodate the coupling to different lines of draft, substantially as described.

4. An evener and whiffle tree coupling having upper and lower members, a coupling eye adapted to receive a draft pin carried by one of said members, and means for normally holding said eye in horizontal position while permitting upward rocking movement thereof to accommodate it to different lines of draft, substantially as described.

5. An evener and whiffletree coupler, comprising top and bottom members secured to the evener bar and having projecting opposed flange or bearing portions, one of said bearing portions having a draft pin which extends through the other member, and a coupling member having an eye which loosely engages the said pin, said eye having a rocking bearing between said bearing portions, the eye and the bearing portions having coöperating bearing and stop surfaces for permitting an upward movement of the eye from its normal position while preventing downward movement below its normal positions; substantially as described.

6. An evener and whiffle tree coupler comprising top and bottom members secured to the evener bar and having opposed flange or bearing portions, one of said bearing portions having a draft pin extending through the other bearing portion and locked therein, and a coupling eye extending between the flange or bearing portions and engaging the draft pin, together with means for permitting an upward rocking movement of said eye to accommodate it to different lines of draft and for preventing its downward movement, substantially as described.

7. An evener and whiffle-tree connection, comprising a member secured to the evener bar and projecting forwardly therefrom, a whiffle-tree having a member secured thereto and projecting rearwardly therefrom, a pivot connection between the said members arranged to permit the free movement of the whiffle-tree partially around the end of the evener bar to a position substantially at right angles to said bar, the two members having coöperating bearing and stop surfaces arranged to permit the whiffle-tree member to assume different angular positions with reference to the other member to adapt the connection to different lines of draft; substantially as described.

In testimony whereof, I have hereunto set my hand.

CHARLES A. HENNICKE.

Witnesses:
August Derner,
Paul Rice.